United States Patent
Hauser

(10) Patent No.: US 6,550,364 B2
(45) Date of Patent: Apr. 22, 2003

(54) WIRE SAWING DEVICE

(75) Inventor: Charles Hauser, Genolier (CH)

(73) Assignee: HCT Shaping Systems SA, Cheseaux (CH)

( * ) Notice: Subject to any disclaimer, the term of this patent is extended or adjusted under 35 U.S.C. 154(b) by 0 days.

(21) Appl. No.: 09/988,182

(22) Filed: Nov. 19, 2001

(65) Prior Publication Data

US 2002/0100354 A1 Aug. 1, 2002

(30) Foreign Application Priority Data

Nov. 20, 2000 (CH) .............................................. 2256/00

(51) Int. Cl.⁷ ................................................. B26D 1/44
(52) U.S. Cl. ........................................ 83/651.1; 125/21
(58) Field of Search ................................ 83/651.1, 435, 83/74; 125/16.02, 21; 185/16.02

(56) References Cited

U.S. PATENT DOCUMENTS

| | | | | |
|---|---|---|---|---|
| 5,181,503 A | * | 1/1993 | Fish et al. ..................... | 125/21 |
| 5,269,285 A | * | 12/1993 | Toyama et al. ........... | 125/16.01 |
| 5,839,425 A | * | 11/1998 | Toyama et al. ........... | 125/16.02 |
| 5,944,007 A | * | 8/1999 | Miyoshi et al. ........... | 125/13.01 |
| 6,041,766 A | * | 3/2000 | Vojtechovsky ............ | 125/16.02 |
| 6,067,976 A | * | 5/2000 | Katayama et al. ............. | 125/21 |
| 6,145,422 A | * | 11/2000 | Katamachi et al. ............. | 83/74 |
| 6,234,159 B1 | * | 5/2001 | Egglhuber ................ | 125/16.02 |
| 6,408,839 B1 | * | 6/2002 | Hauser ..................... | 125/16.02 |

\* cited by examiner

Primary Examiner—Allan N. Shoap
Assistant Examiner—Ghassem Alie
(74) Attorney, Agent, or Firm—Young & Thompson

(57) ABSTRACT

The wire sawing device includes two external wire guide cylinders (1, 2) having a diameter (D1) smaller than that (D2) of the two internal wire guide cylinders (3, 4). The external wire guide cylinders are driven in rotation by a power drive to cause the movement of the wires of a layer of wires (6), whilst the internal wire guide cylinders (3, 4) ensure only the function of guidance without driving the wires of the layer of wires. By the separation of the drive function from the guide function of the wire, substantial heating of the guiding wire guide cylinders can be avoided, which permits obtaining sawed pieces of high precision without undulations.

6 Claims, 2 Drawing Sheets

WIRE SAWING DEVICE

The present invention relates to a wire sawing device comprising wire guide cylinders supporting a wire held in position by grooves provided on the surface of the wire guide cylinders which define the interval between the wires of at least one layer of wires, the wire being adapted to move with alternating or continuous movement bearing against at least one piece to be sawed.

During cutting of thin slices from a piece to be sawed, the stretched wire is both guided and tensioned by the wire guide cylinders. These wire guide cylinders, generally coated with a layer of synthetic material, are engraved with grooves whose geometry and dimensions must be very precise. The wire is wound spirally about the wire guide cylinders and forms between two wire guide cylinders at least one layer of parallel wires whose successive inter-wire distance fixes the thickness of the slices. Moreover, the plane of the layer of wires forms, in known devices, a fixed angle generally perpendicular to the direction of sawing, which can lead to undulations and striations on the surface of the slices in the case of general lateral movement of the layer of wires resulting from thermal oscillations for example. These undulations, even of several micrometers of amplitude, suffice to render the slices unusable for certain applications such as silicon for the semiconductor industry. The thermal variations arise from two principal causes, namely the energy used for sawing properly so called, and the energy dissipated in the mechanical elements such as the roller bearings and particularly in the bearings supporting the wire guide cylinders. However, the requirement of the industry to provide more and more first class machines, whether as to productivity or as to the dimensions of the pieces to be sawed, requires higher and higher powers for sawing properly so called and mechanical elements that are progressively greater in size, hence which dissipate more energy. If therefore it is not possible to eliminate the dissipation of energy in the entire machine, the cutting energy must be controlled and recovered by a cooling system. On the other hand, the energy generated in the mechanical elements is not often controlled and recovered other than in an indirect manner because of the mechanical complexity of the more sensitive elements. One of the causes of heating of the support bearings of the wire guide cylinders is the great load on these due to the tension of the layer of wires. The latter can amount to up to several tons, for large capacity sawing devices. From the heating that thus arises, there result thermal variations and thermal oscillations generating undulations or waves in the sawed slices.

Wire sawing devices of the mentioned type with oscillation of the layer of wires or of the piece to be sawed are already known, especially in the industry of electronic components of ferrites, quartz and silica, to obtain thin slices of material such as poly or monocrystalline silicon or new materials such as GaAs, InP, GGG or else quartz, synthetic sapphire, ceramic materials. The high price of these materials renders wire sawing more attractive in comparison to other techniques such as diamond disc sawing. But all the devices provided have wire guide cylinders whose geometric arrangement gives rise to a heavy load on the bearings and because of this gives rise to a great dissipation of energy and hence poor control of temperature and as a result altered precision.

The present invention has for its object to overcome these principal drawbacks, and the invention is characterized to this end by the fact that the sawing device comprises two external wire guide cylinders and two internal wire guide cylinders disposed between the external wire guide cylinders, whose diameter is smaller than that of the interior wire guide cylinders, and by the fact that these external wire guide cylinders are driven in rotation by drive members to cause the movement of the wires of the layer of wires, whilst the internal wire guide cylinders ensure a guide function without driving the wires of the layer of wires, the wire being spirally wound about the assembly of wire guide cylinders without the layers crossing.

The combination of these characteristics permits overcoming the mentioned drawbacks by separating the function of driving the layer of wires from the function of guiding said layer of wires. This separation of the functions comes about by placing in parallel and on a same plane, four wire guide cylinders. The two end cylinders serve for driving and hence are accordingly motor driven with a high power, and the two internal cylinders serve for guiding the layer of wires. These two internal wire guide cylinders are those which give precision to the slices. As they are subjected only to very low loads, their bearings heat up very little and because of this have almost no influence on the local thermal equilibrium. As a result, there is higher precision of the pieces to be sawed. During sawing with a layer of non-crossing parallel wires, it will be necessary that the external wire guide cylinders or drive cylinders have a smaller diameter than the internal cylinders so as to give to the layer of wires a sufficient guide surface to ensure precision of guiding.

Naturally, these internal wire guide cylinders can be power driven so as to compensate the effects of inertia due to the weight of the wire guide cylinders themselves, especially during back and forth sawing. During continuous sawing, the friction forces of the layer on the internal wire guide cylinders can be sufficient to drive them without a motor. In the case of motorized drive of the internal wire guide cylinders, this motorized drive of low power serves only to drive without slipping the wire guide cylinders and in no case will serve to drive the layer of wires for sawing. The separation of the drive and guide functions must necessarily be provided. It will also be necessary that the grooves engraved in the wire guide cylinders have a high precision, resulting in the quality of the slices.

The surface condition of the obtained pieces, if it is not controlled, can throw doubt on the whole process. This sawing technique thus further requires a minimization of the energy dissipated in the sawing region so as to avoid any thermal movement due to the expansion resulting from energy dissipated in sensitive regions such as the bearings of the wire guide cylinders. The separation of the drive and guiding functions, as proposed by the invention, permits minimizing these defects in the course of sawing. Poor thermal control, even at a low level, will result in slices that are unacceptable for subsequent processes.

The requirements of electronic applications, for example connected to the increasing dimensions of the pieces to be sawed, require that even the smallest variations be avoided. It is accordingly therefore no longer sufficient to saw slices without eliminating forces arising from the wire guide cylinders, and hence without separating the guide and drive functions of the layer of wires.

The sawing device with separation of the guiding and drive functions of the wire guide, which is the object of the present invention, permits minimizing the thermal variations in the sawing region, hence producing pieces of increased precision.

The geometric arrangement of the wire guide permitting the separation of the sawing forces from the guide forces, according to the present invention, comprises an assembly of four wire guide cylinders disposed parallel in a same plane, the external wire guide cylinders imparting the sawing force having a smaller diameter than the internal cylinders effecting guiding. Moreover, during reciprocating operation, the internal wire guide cylinders can also be power driven so as to avoid slipping which could result due to inertia of these latter. In this case, there will be no slipping during acceleration and deceleration between the wire of the layer of wires and the surface of the guiding wire guide cylinders. The use of this type of device permits producing pieces of increased precision.

Other advantages will become apparent from the characteristics set forth in the dependent claims and from the following description of the invention in greater detail with the help of drawings which show schematically and by way of example one embodiment.

Figure 1:
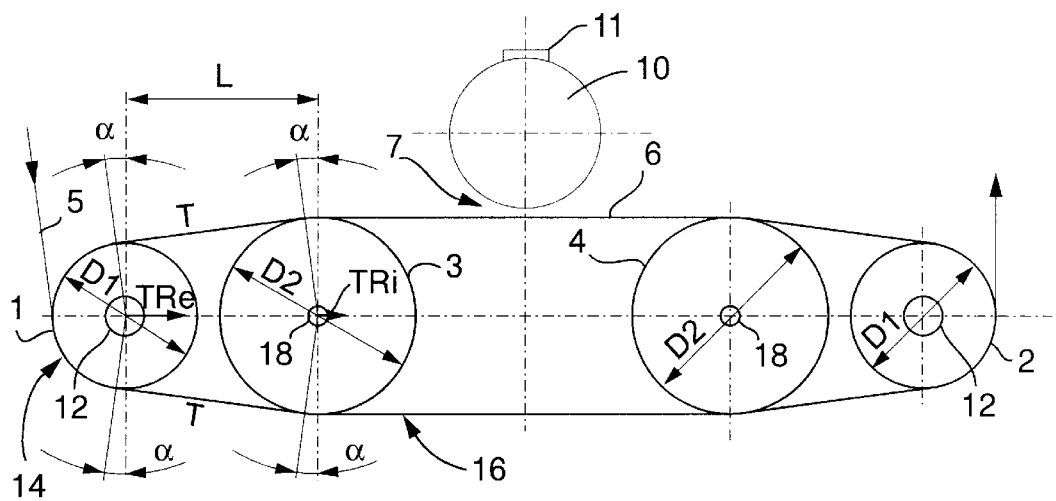
FIG. 1 is a schematic side view of this embodiment.
Figure 2:
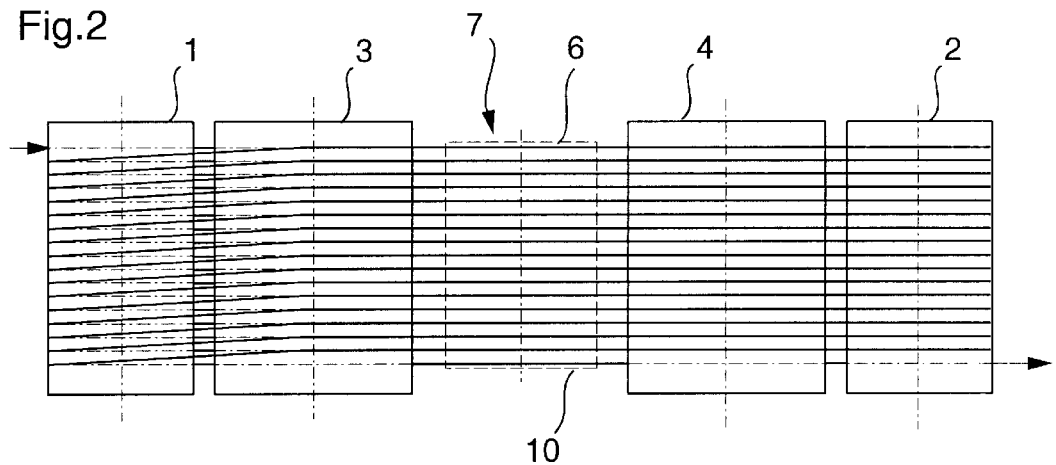
FIG. 2 shows schematically a top plan view of this embodiment.
Figure 3:
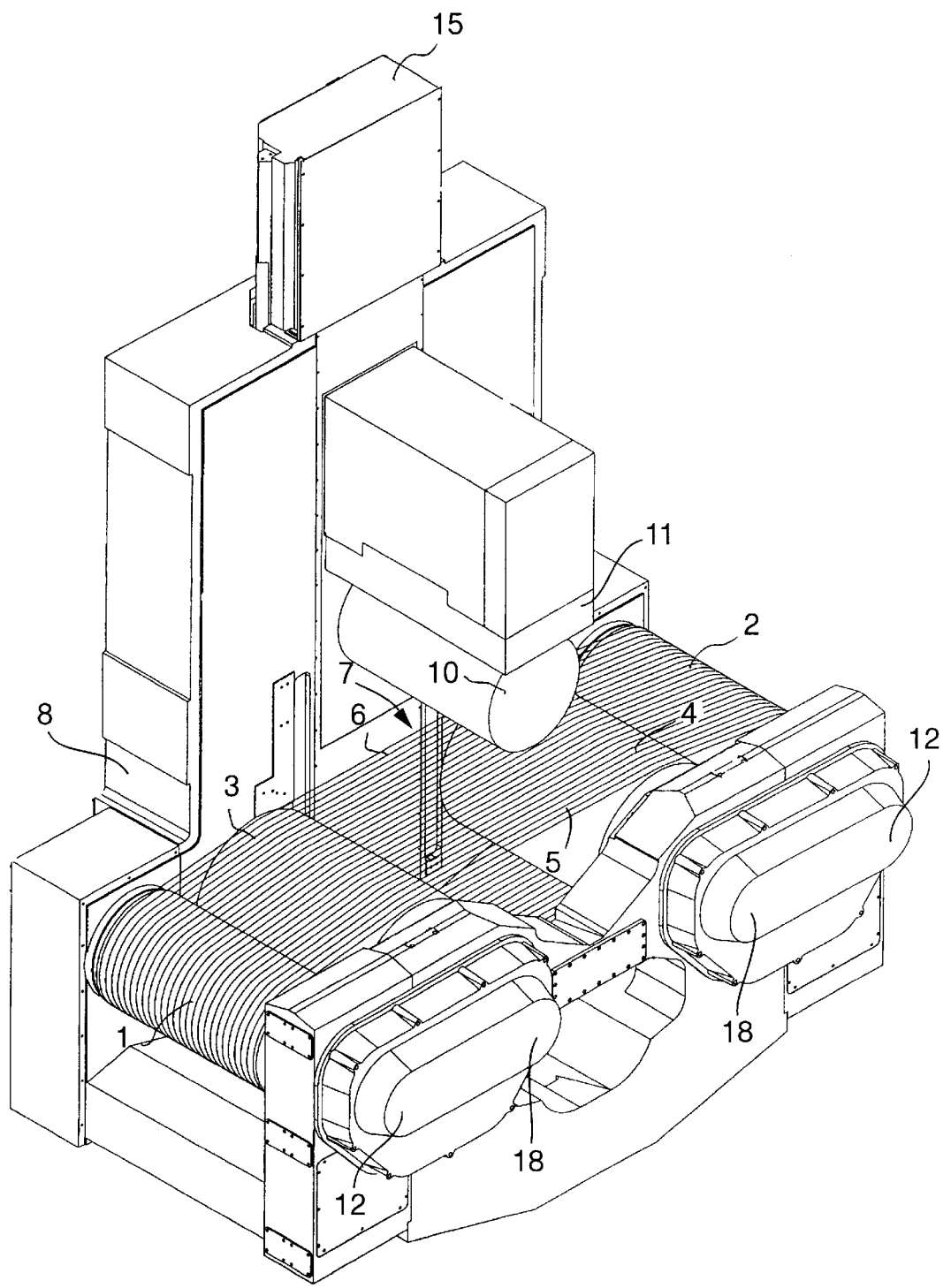
FIG. 3 is a perspective view of this embodiment.

With reference to FIGS. 1 to 3, the sawing device comprises an assembly of four wire guide cylinders 1 to 4 mounted on a chassis 8 and disposed parallel with their axes disposed in a same plane. The external wire guide cylinders 1, 2 have a diameter D1 smaller than the diameter D2 of the internal wire guide cylinders 3, 4.

The wire 5, unrolled from a supply spool (not shown), is then wound spirally about the four cylinders by passing successively over all the lower sides and then the upper sides of these cylinders to form a layer 6 of wires that are parallel in a sawing zone 7. The wire is then retrieved in a suitable device (not shown), such as a receiving spool or a recovery container.

A piece 10 to be sawed, such as an ingot of hard or fragile material, is mounted on a work table 11 and caused to bear by means of a motorized sliding column 15, against the layer 6 of wires in the machining region 7, which comprises a layer of non-crossing wires.

The periphery of the wire guide cylinders 1 to 4 is engraved with grooves defining the interval between adjacent wires of the layer of wires 6, and hence the thickness of the sawed slices. The wire is stretched and both guided and tensioned by the external wire guide cylinders. It is either covered with a fixed abrasive or supplied continuously with a free abrasive generally in suspension in a liquid, and hence serves to carry particles of abrasive which carry out the work of sawing.

The wire can be driven with a continuous or reciprocating movement.

The two external wire guide cylinders 1 and 2 are in engagement with a drive motor schematically indicated at 12. These external wire guide cylinders thus serve as drive means 14 for the wire. On the contrary, the internal wire guide cylinders 3, 4 of a greater diameter than the external cylinders, do not drive the wire but serve exclusively as guide means 16. In the case of single direction movement of the wire 5, these internal wire guide cylinders 3, 4 are not normally driven and free wheel by being driven by the layer of wires.

When the external wire guide cylinders 1, 2 impress on the wire 5 a reciprocating movement, the internal wire guide cylinders 3, 4 can be motor driven, not to drive the wire, but so as to avoid relative slippage between the wires and wire guide cylinders which could result from changes in direction of rotation and the inertia of the internal wire guide cylinders 3, 4. The auxiliary weaker motor drive 18 of the internal wire guide cylinders 3, 4 is thus arranged so as to overcome any slippage during acceleration and deceleration between the wires of the layer of wires and the surface of the internal wire guide cylinders 3, 4.

During continuous sawing, the frictional forces of the layer of wires on the internal wire guide cylinders 3, 4 can be sufficient to drive these without a motor drive. In the case of a motor drive 18 of the internal wire guide cylinders, this low power motor drive 18 serves only to drive without slipping the internal wire guide cylinders and in no case will serve to drive the layer of wires 6 for sawing. The separation of the drive function and guide function among the wire guide cylinders 1 through 4 is thus necessarily provided.

This arrangement with two external wire guide cylinders 1, 2 power driven with high power and playing the role of drive means, and with two internal wire guide cylinders 3, 4 serving for guidance of the layer of wires, permits obtaining a high precision of sawing. The internal wire guide cylinders 3, 4 are those which give precision to the slices. As they are subjected to only very low loads, their bearings heat up very little and because of this practically do not influence the local thermal equilibrium. There results a better precision of the sawed slices.

Figure 4:
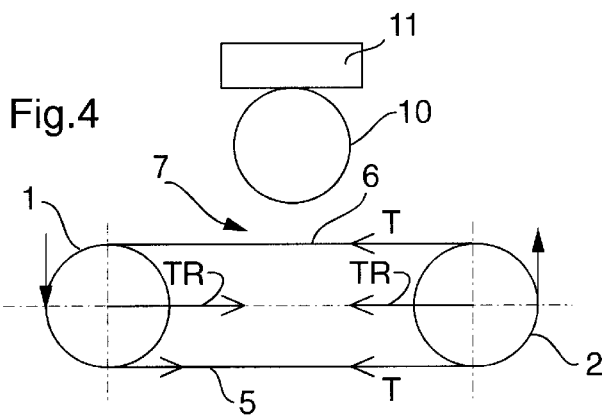
FIG. 4 shows schematically a known device.

FIG. 4 shows a known sawing device with two motor driven wire guide cylinders 1, 2. The force TR resulting from the traction T of the layer of wires 6 on the bearing of the cylinders is $$TR=2T$$

This resulting force is hence very high and gives rise to heating of the bearings and the surrounding members, which gives rise to thermal disturbances and deformations, hence to undulations and striae on the surface of the obtained slices.

In the case of the configuration according to the present invention (FIG. 1), the resultant force Tre on the external wire guide cylinder bearings is $$TRe=2T \cos \alpha$$

in which

T is the traction exerted by the layer of wires $\alpha$ is the angle of inclination made by the layer of wires between the external and internal wire guide cylinders, with a plane passing through the axes of said wire guide cylinders;

$$\sin\alpha = \frac{D2 - D1}{2L};$$

in which

L is the distance separating the axes of the internal and external wire guide cylinders.

The resultant force TRi acting on the bearings of the internal wire guide cylinders is $$TRi=2T(1-\cos \alpha)=2T \sin^2\alpha/2$$

Hence

TRi<<TRe for small $\alpha$

Considering that the angle $\alpha$ is small, for example of the order of 2 to 15°, the resulting force TRi exerted on the bearings of the internal wire guide cylinders is much smaller than the force TRe encountered by the external wire guide cylinders, for example lower than 15% and preferably lower than 5% of TRe.

The heating of the bearings of the internal wire guide cylinders 3, 4 is thus very small. As a result, there is increased precision of the sawed pieces.

During sawing with a layer of non-crossing wires, as is the case of the present invention, it is necessary that the diameter D1 of the external driving wire guide cylinders be smaller than the diameter D2 of the internal guiding wire guide cylinders, so as to give to the layer of wires a sufficient guide surface permitting insuring this guiding function. The ratio D1/D2 could typically be 0.75 and comprised between 0.5 and 0.9.

As FIGS. 2 and 3 show, the wire is arranged over external and internal wire guide cylinders in a non-crossing fashion with the same interval, which permits further increasing the precision of the sawed pieces. All the wires of the layer of wires of the present invention move with a given movement in the same direction of movement, which can be advantageous in certain cases relative to devices with crossing layers of wires in which adjacent wires in the layers of wires move with opposite directions, which can induce shear deformations in the thin slices of certain very delicate materials, subject to rapid formation of dislocation.

Of course the embodiment described above is in no way limiting and can be the subject of any desirable modifications within the scope defined by claim 1. In particular, the values of the diameters D1 and D2 of the cylinders and the length L could be different and could have mutually different ratios. The axes of the cylinders could be slightly offset and not located in a same plane. The lower layer of wires could also be used for sawing. There could thus be in the upper and lower layer two or more sawing tables. On each table, one or several pieces to be sawed could be fixed. The external cylinders could be driven by a single motor or by two motors.

What is claimed is:

1. Wire sawing device comprising wire guide cylinders (1 to 4) supporting a wire (5) maintained in position by grooves provided on the surface of the wire guide cylinders, which define the interval between the wires of at least one layer (6) of wires, the wire being adapted to move with reciprocal or continuous movement while bearing against at least one piece (10) to be sawed, characterized by the fact that it comprises two external wire guide cylinders (1, 2) and two internal wire guide cylinders (3, 4) disposed between the external wire guide cylinders, whose diameter is smaller than that of the internal wire guide cylinders, and by the fact that the external wire guide cylinders (1, 2) are driven in rotation by motor means to cause the movement of the wires of the layers of wires, whilst the internal wire guide cylinders (3, 4) ensure the function of guidance without driving the wires of the layer of wires, the wire being spirally wound about the assembly of wire guide cylinders without the layers crossing.

2. Device according to claim 1, characterized by the fact that the axes of the external and internal wire guide cylinders are disposed in a plane.

3. Device according to claim 1, characterized by the fact that the external wire guide cylinders (1, 2) are power driven (12), whilst the internal wire guide cylinders are connected to an auxiliary weaker power drive (18) adapted to avoid slippage of the wires of the layer of wires on the surface of the internal wire guide cylinders.

4. Device according to claim 1, characterized by the fact that the internal wire guide cylinders turn freely.

5. Device according to claim 1, characterized by the fact that the diameter (D1) of the external wire guide cylinders and the diameter (D2) of the internal wire guide cylinders, as well as the distance (L) separating the axes of the internal and external wire guide cylinders, are selected such that the resulting force (TRi) from the fraction (T) of the layer of wires on the internal wire guide cylinders is less than 15% of that (TRe) acting on the external wire guide cylinders.

6. Device according to claim 5, characterized by the fact that the layer of wires (6) makes, between the external and internal wire guide cylinders, an angle of 2 to 15° with the plane passing through the axes of the wire guide cylinders (1 to 4).

* * * * *